United States Patent Office 2,894,446
Patented July 14, 1959

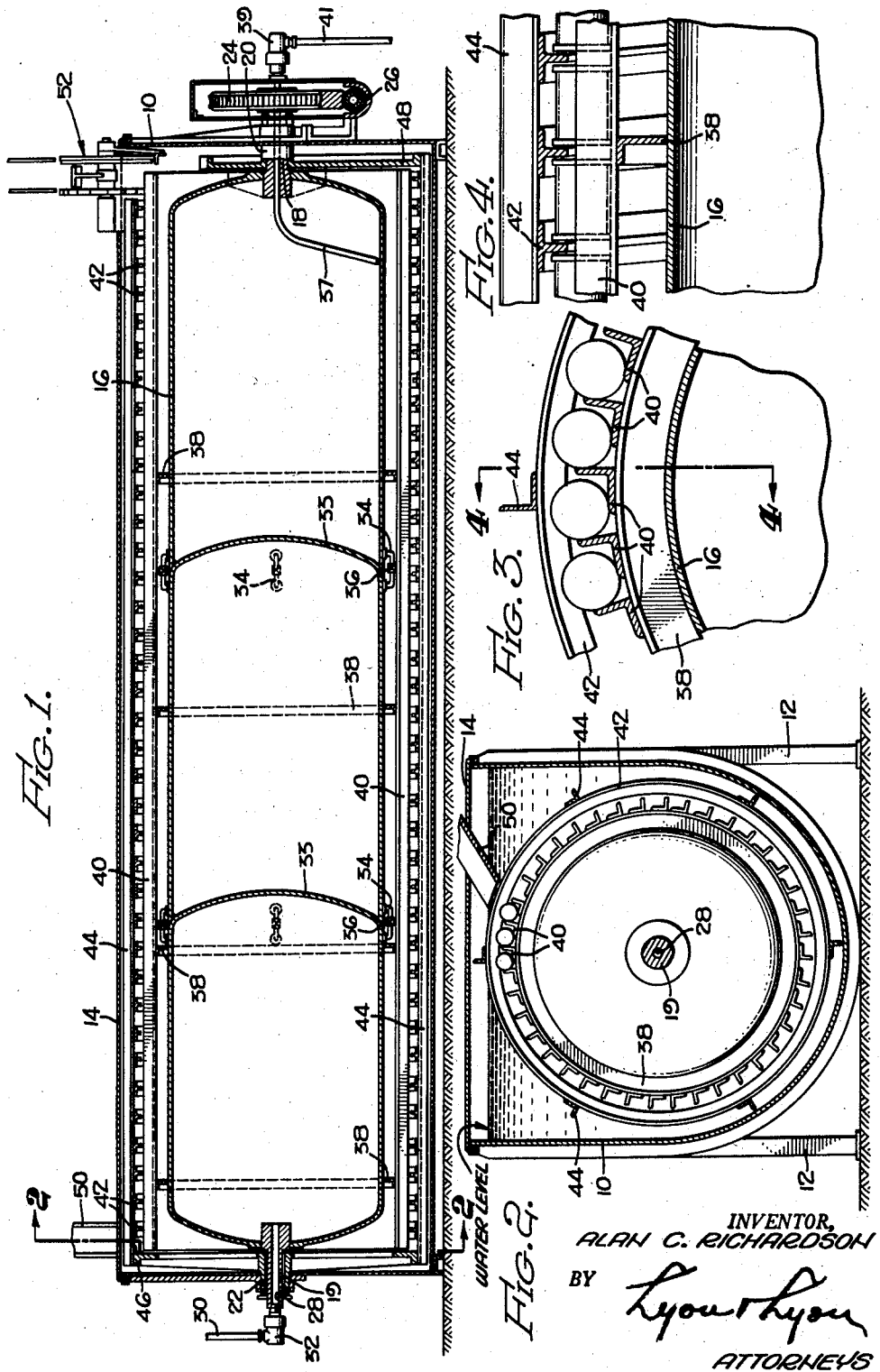

2,894,446

CONTINUOUS COOKER AND HEAT EXCHANGER

Alan C. Richardson, Berkeley, Calif., assignor to California Packing Corporation, San Francisco, Calif., a corporation of New York Application November 2, 1953, Serial No. 389,583

3 Claims. (Cl. 99—361)

This invention relates to an improved continuous heat exchanger for processing food products.

It is an object of this invention to provide means for processing food products in hermetically sealed containers by means of heat transfer either by adding heat when the device is used as a cooker or withdrawing heat when the device is used as a cooler.

Another object of this invention is to provide heat exchanging means whereby the desired amount of heat necessary for processing food products in hermetically sealed containers may be transferred with maximum thermal efficiency and minimum waste.

A futher object of this invention is to provide a heat exchanger which will provide such thermal efficiency without necessity of enclosing the containers in a pressure-tight chamber.

A further object of this invention is to provide a heat exchanging means for producing maximum thermal efficiency in an atmospheric heat exchanger.

A still further object of this invention is to provide heat exchanging means wherein the quantity of heat supplied to or extracted from food in hermetically sealed containers can be controlled and varied throughout the path of the containers through the exchanger.

A still further object of this invention is to apply to food-containing hermetically sealed containers a sufficient quantity of heat to cook the food contents thereof and/or to sterilize the containers when the heat exchanger is utilized for cooking.

Yet another object of this invention is to provide heat exchanging means whereby heat is supplied in great quantities to food-containing hermetically sealed containers upon insertion into a cooker and at greatly reduced quantities adjacent the discharge point from the cooker, thereby reducing waste of heat when the heat exchanger is utilized as a cooker.

It is a further object of this invention to provide heat exchanging means wherein steam is utilized to provide heat for food in hermetically sealed containers without direct contact with the containers being processed when the heat exchanger is utilized as a cooker.

It is a further object of this invention to provide means whereby steam can be circulated through the heat exchanging means and the condensate returned to the steam supply without contamination when the heat exchanger is utilized as a cooker.

It is a still further object of this invention to provide a continuous cooker wherein overflow of water or other liquid heating medium is eliminated permitting addition of suitable chemicals to the water for inhibiting corrosion of the cooker and/or raising the boiling point of the water in which the food is cooked.

It is a further object of this invention to provide heat exchanging means wherein heat may be extracted from hermetically sealed containers.

It is a further object of this invention to provide a heat exchanger wherein the cooling medium is utilized without expenditure thereof.

It is a further object of this invention to provide a heat exchanger wherein the loss of expendable water in which hermetically sealed food containers are immersed is greatly reduced.

Still a further object of this invention is to provide a heat exchanger wherein the expendable water in which hermetically sealed containers are immersed can be moved at a greater velocity producing a greater cooling effect per gallon of expendable water than has heretofore been obtainable.

Other objects and advantages will be readily apparent from the following description:

In the drawings:

Figure 1 is a side elevation in section of a continuous heat exchanger embodying this invention.

Figure 2 is a section taken along line 2—2 of Figure 1.

Figure 3 is a fragmentary section of a view of the reel and can track.

Figure 4 is a section taken along line 4—4 of Figure 3.

While the invention applies to a heat exchanger which may be utilized to cook the food contents in a hermetically sealed container, it may also be utilized for cooling such containers, and the use as a cooker is first described.

The preferred embodiment of this invention, as illustrated in the accompanying drawings, contemplates a tank 10 supported upon legs 12 and adapted to be filled with water. The cooker is of the atmospheric type, that is, it functions at atmospheric pressure, although the tank may be provided with a lid 14. Mounted within the tank is a drum 16. The drum has shafts 18 and 19 at its ends which are rotatably mounted in suitable bearings 20 and 22 mounted in the end walls of the tank. The shaft 18 has a pinion 24 thereon which is driven by worm gear 26 in turn driven by any suitable source of power, thereby rotating drum 16.

Projecting through shaft 19 is a port 28 which forms the inlet for steam or other suitable primary heating medium to the interior of the drum. Steam or other primary heating medium from a suitable boiler, not shown, is directed through pipe 30 and slip joint 32 to port 28. The slip joint may be of any suitable type well known to those skilled in the art.

The drum has its interior divided into three compartments by walls 33, which compartments communicate with one another through lines such as 34. Each line has a suitable adjustable pressure relief valve 36 therein, which valves are set so that the pressures in the three compartments are different. Thus the pressure in the first compartment adjacent the primary heating medium inlet may be maintained at a relatively high level, with the pressure in the interediate chamber at a lower level and the pressure in the compartment adjacent the outlet at still a lower level. In this manner the quantity of heat supplied to the containers during their progress through the cooker may be varied to provide maximum heat exchange at the initial stages of the cooking process in accordance with the rate heat is absorbed by the contents of the cans and a reduced heat exchange at the end of the heating process, thereby greatly reducing heat waste through excessive boiling of the water or other secondary heating medium surrounding the cans. A pipe 37 projects through shaft 18 and into a slip joint 39 so that condensate is exhausted from the drum 16 through line 41 and returned to the boiler. As seen in Figure 2, the tank 10 is filled with water or other secondary heating medium which is heated to the desired temperature by the steam flowing through drum 16 and is circulated through a suitable inlet and outlet to the tank. About the periphery of the drum 16 are provided angle irons 38 spaced from one another so as to provide support means for the can supporting angle irons 40, which are spaced from one another around the periphery of the drum 16.

Spaced from the can supporting irons 40 is a T-bar 42 which is wound around the outside of the supporting irons 40 in the form of a helical track. The T-bar 42 is supported by a plurality of braces 44 which in turn are supported by braces 46 and 48.

The cans which have been filled and hermetically sealed are delivered through inlet chute 50 onto the can supporting angle irons 40, as seen in Figures 1 and 2. As the drum 16 is rotated, the cans are carried by the supporting members 40. The cans fit between adjacent coils of the T-bar 42 and hence are moved in a helical path about the periphery of the drum until delivered to the outlet chute 52 and are removed in any suitable manner well know to those skilled in the art.

In operation, cans to be processed are hermetically sealed and delivered through chute 50 onto the supporting irons 50 and between adjacent coils of T-bar 42. As drum 16 and hence supporting irons 40 are rotated, the cans are moved about a helical path to the outlet chute 52. During the passage of the cans through the cooker they are immersed in water. The water is heated by means of steam flowing through the drum 16 in the same direction as the movement of the cans. To conserve heat and further increase the thermal efficiency of heat exchanging means thus formed, the drum 16 is divided into compartments comunicating with one another through pressure-actuated relief valves so that the pressure in the compartments may be regulated. Thus the pressure in the compartment adjacent the can inlet is relatively high and hence maximum heat transfer occurs at this extremity of the cooker. This is desirable because in processing filled cans it has been determined that the cans' capacity to absorb heat is very high at the beginning of the cooking process and tapers off until relatively low at the termination of the cooking process. Similarly, the pressure in the other compartments and the rate of heat exchange can be regulated so that a minimum of heat waste occurs.

While the above description applies to use of the heat exchanger as a cooker, if uncontaminated water is circulated through the drum and expendable water circulated through the tank, the device is readily adapted for use as a cooler. The uncontaminated water is circulated through a closed system thereby cooling the secondary medium without itself being expended. Thus the quantity of secondary cooling medium is reduced. The velocity of the expendable water is increased by the displacement of the drum, producing a greater cooling effect per gallon of cooling water utilized.

While what hereinbefore has been described is the preferred embodiment of this invention, it is readily apparent that alterations and modifications can be resorted to without departing from the scope of this invention, and such alterations and modifications are intended to be included within the scope of the appended claims.

I claim:

1. A continuous heat exchanger comprising: a tank adapted to hold water, a drum rotatably mounted in said tank below the water level therein, means dividing said drum into at least two compartments in abutting longitudinal relationship along the tank, means for directing heat transferring medium into said drum, means communicating said compartments and regulating the pressure differential therebetween, and means for progressing food-containing hermetically sealed containers to be processed longitudinally through said tank from one extremity of said drum to the other.

2. A continuous heat exchanger comprising: a tank adapted to hold water, a drum rotatably mounted in said tank below the water level therein, means dividing said drum into at least two compartments in abutting longitudinal relationship along the tank, means for directing heat transferring medium into said drum, means communicating said compartments and regulating the pressure differential therebetween, and means for progressing food-containing hermetically sealed containers to be processed longitudinally through said tank along a helical path around said drum commencing at one end of said drum and terminating at the other end.

3. A continuous heat exchanger comprising: a tank adapted to hold water, a drum rotatably mounted in said tank below the water level therein, means dividing said drum into at least two compartments in abutting longitudinal relationship along the tank, means for progressing food-containing hermetically sealed containers to be processed longitudinally through said tank along a helical path around said drum commencing at one end of said drum and terminating at the other end, and means for directing heat transferring medium through said compartments in said drum whereby the rate of heat transfer from the medium in said drum to water in said tank is greatest in the compartment adjacent the beginning of the path of containers through said tank.

References Cited in the file of this patent

UNITED STATES PATENTS

| | | |
|---|---|---|
| 1,424,500 | McCullouch | Aug. 1, 1922 |
| 1,551,134 | Chapman | Aug. 25, 1925 |
| 1,721,562 | Keeney | July 23, 1929 |
| 1,803,994 | Chapman | May 5, 1931 |
| 1,939,372 | Thompson | Dec. 17, 1933 |
| 2,435,959 | Eaby | Feb. 17, 1948 |